United States Patent
Agrawal et al.

(10) Patent No.: US 12,215,733 B2
(45) Date of Patent: Feb. 4, 2025

(54) PINS FOR MATS HAVING INTEGRATED WHEELS

(71) Applicant: Newpark Mats & Integrated Services LLC, The Woodlands, TX (US)

(72) Inventors: Gaurav Agrawal, The Woodlands, TX (US); Keith J. Murphy, Hartford, CT (US); Jared B. Howenstine, Hartford, CT (US)

(73) Assignee: NEWPARK MATS & INTEGRATED SERVICES LLC, The Woodlands, TX (US)

( * ) Notice: Subject to any disclaimer, the term of this patent is extended or adjusted under 35 U.S.C. 154(b) by 184 days.

(21) Appl. No.: 17/973,665

(22) Filed: Oct. 26, 2022

(65) Prior Publication Data
US 2024/0141934 A1 May 2, 2024

(51) Int. Cl.
*F16B 5/06* (2006.01)
*F16B 21/02* (2006.01)

(52) U.S. Cl.
CPC ............ *F16B 5/0642* (2013.01); *F16B 21/02* (2013.01); *F16B 5/06* (2013.01)

(58) Field of Classification Search
CPC ........ F16B 5/0092; F16B 5/06; F16B 5/0642; F16B 5/10; F16B 21/02; F16B 21/08; B60B 33/00; B60B 33/0036; B60B 33/04; B60B 33/06

USPC ...................... 411/349, 350; 16/18 R, 19, 45
See application file for complete search history.

(56) References Cited

U.S. PATENT DOCUMENTS

| | | | | |
|---|---|---|---|---|
| 664,798 A * | 12/1900 | Weidman | ................ | B60B 33/06 16/21 |
| 2,675,246 A * | 4/1954 | Arones | ............... | A47L 11/4072 15/49.1 |
| 3,441,974 A * | 5/1969 | Hollie | ..................... | F16M 11/24 16/33 |
| 4,783,879 A * | 11/1988 | Weaver | .................... | B60B 33/04 280/43.24 |
| 6,701,570 B2 * | 3/2004 | Henriott | ............. | B60B 33/0007 16/31 R |
| 7,303,800 B2 * | 12/2007 | Rogers | ..................... | B32B 3/02 428/44 |
| 8,484,801 B2 * | 7/2013 | Li | ........................ | B60B 33/0089 16/18 CG |

\* cited by examiner

*Primary Examiner* — Roberta S Delisle
(74) *Attorney, Agent, or Firm* — CANTOR COLBURN LLP (57) ABSTRACT

Mat locking pins include a pin body and a wheel housed within the pin body, the wheel configured to be movable from a first position to a second position, wherein in the first position the wheel is housed within the pin body and in the second position at least a portion of the wheel extends from the pin body. Mat systems include such mat locking pins to enable movement of the may system and/or secure two mats together.

20 Claims, 11 Drawing Sheets

PINS FOR MATS HAVING INTEGRATED WHEELS

BACKGROUND

When performing operations with heavy equipment it may be useful to provide a firm, stable, and continuous support surface to support such heavy equipment or otherwise provide for a stable work surface and/or a support surface over which vehicles may be conveyed. Such support surfaces can provide support for the equipment, vehicles, and personnel involved in work processes and may be configured to withstand severe weather and other harsh environmental impacts. The components of the support surface may be capable of being quickly and easily installed and capable of being quickly and easily removed and reused.

Wooden boards or planks have historically been used to construct temporary roadways and equipment support surfaces in remote or undeveloped areas where the terrain lacks sufficient integrity to adequately support trucks and other heavy equipment. Such boards were generally placed end to end, or side by side, to form a continuous load supporting surface. While individual wooden boards or planks have been used to construct support surfaces for some time, this method of building roadways and other load bearing surfaces suffers from some very significant disadvantages.

A variety of mat systems have been developed for the construction of temporary roadways and support surfaces. These mat systems typically utilize prefabricated, multi-layered mats which can be installed in a variety of configurations to create roadways or other support surfaces. These mats, may interconnect or inter mesh with one another to form a continuous, or nearly continuous, support surface. When joining multiple mats to form a work surface or the like, the mats may be secured together using pins that are inserted into overlapping portions of two adjacent or connected mats. Once assembled, the work surface is stationary and to move such a surface, the mats are disconnected and individually moved to a new location. It may be advantageous to have improved mats and systems for providing and creating temporary roadways and/or support surfaces.

BRIEF DESCRIPTION OF THE DRAWINGS

The subject matter is particularly pointed out and distinctly claimed at the conclusion of the specification. The foregoing and other features, and advantages of the present disclosure are apparent from the following detailed description taken in conjunction with the accompanying drawings in which:

DETAILED DESCRIPTION

Figure 1A:
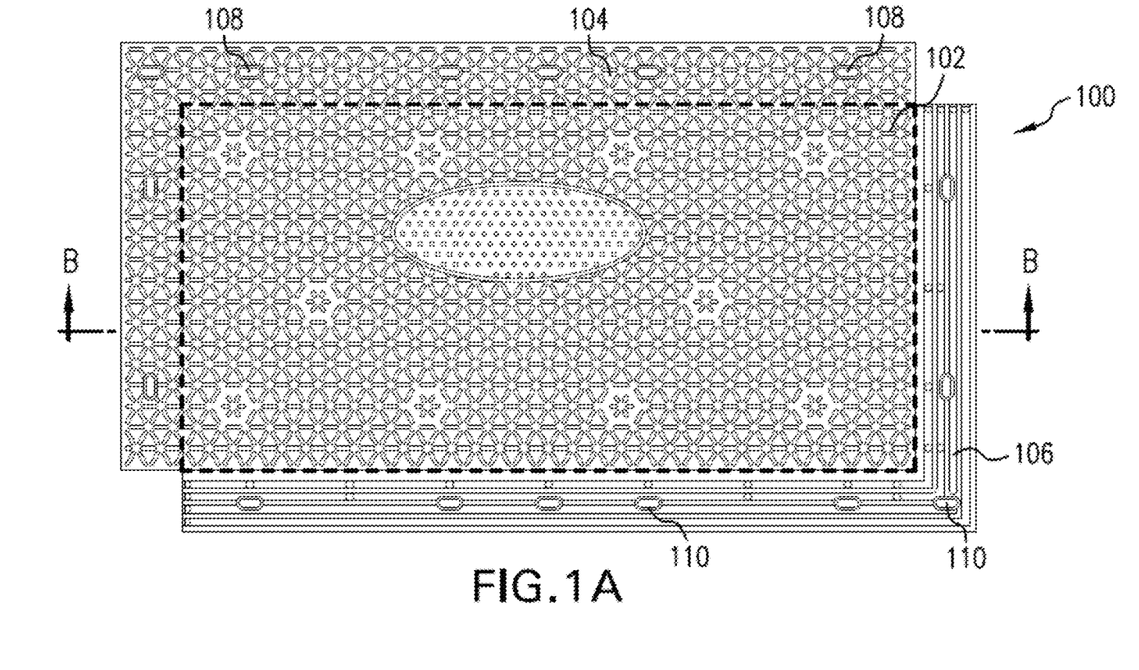
FIG. 1A is a schematic illustration of a mat that may incorporate embodiments of the present disclosure.
Figure 1B:
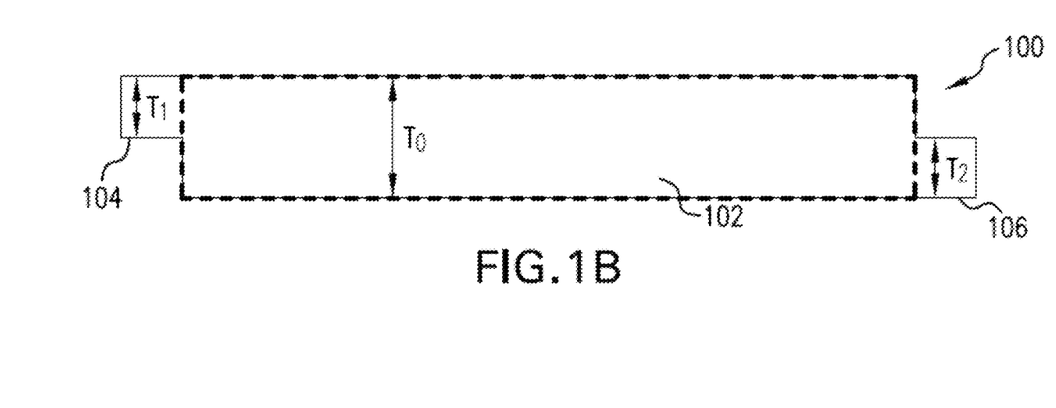
FIG. 1B is a cross-sectional illustration of the mat of FIG. 1A as viewed along the line B-B of FIG. 1A.

Referring to FIGS. 1A-1B, schematic illustrations of a mat 100 in accordance with embodiments of the present disclosure are shown. The mat 100 is configured to be a stand-alone structure or may be joined with one or more additional similar mats to define a support surface of a desired shape and/or size. The mat 100 is configured to provide a work or support surface over which vehicles may traverse, equipment may be installed and operated, etc. FIG. 1A illustrates a top-down plan view illustration of the mat 100 and FIG. 1B is a cross-sectional illustration of the mat 100 as viewed along the line B-B in FIG. 1A. The mat 100 can include a main body 102, a first lip structure 104, and a second lip structure 106. As shown, the main body 102 has a main body thickness $T_0$, and each lip structure 104, 106 has a respective lip structure thickness $T_1$, $T_2$. The mat 100 can be configured to be joinable with other similar mats, and the sum of the lip structure thicknesses $T_1$, $T_2$ can equal the main body thickness $T_0$. In an embodiment, the lip structure thicknesses $T_1$, $T_2$ can each be equal to half the main body thickness $T_0$.

The lip structures 104, 106 each extend outward from the main body 102. In one or more embodiments, each of the lip structures 104, 106 may extend from about half of a perimeter of the main body 102. The lip structures 104, 106 each include, as shown, respective pin apertures 108, 110 that are configured to receive a locking pin (not shown) to join two mats that are arranged adjacent to each other with pin apertures aligned. Such locking pins can be used to ensure a secure and continuous surface defined by the joined mats. That is, if two mats similar to that shown in FIGS. 1A and 1B are joined by one or more locking pins installed through aligned pin apertures 108, 110, a first lip structure 104 on one mat 100 may overlap a second lip structure 106 of the adjacent mat, with the joined first and second lip structures of the two mats having a thickness equal to the main body thickness $T_0$.

Although shown and described as distinct components or features, the main body 102, the first lip structure 104, and the second lip structure 106 may be formed of a single continuous material (e.g., a uniform body), from two panels or portions joined together, or from three or more joined panels of portions. As a non-limiting example, the lip structures 104, 106 can be separately attached to, bonded to, or otherwise secured to the main body 102. As another example, the main body 102 can be formed from two panels, each having one of the lip structures 104, 106, and the two panels can be attached, bonded, or otherwise secured together. Accordingly, the illustrative configuration shown and described with respect to FIGS. 1A-1B is not intended to be limiting, but rather is provided for illustrative and explanatory purposes only.

The main body 102 may have a solid or non-solid interior structure, such as voids or cavities defined by ribs or the like. For example, in some embodiments the main body 102 may have an interior support structure configured to provide strength, stability, and/or rigidity to the mat 100. The interior support structure may be a combination of voids and ribs that are encapsulated by exterior surfaces of the main body. Such voids or cavities can permit a reduction in weight as compared to a solid interior structure of the mat 100.

Figure 2:
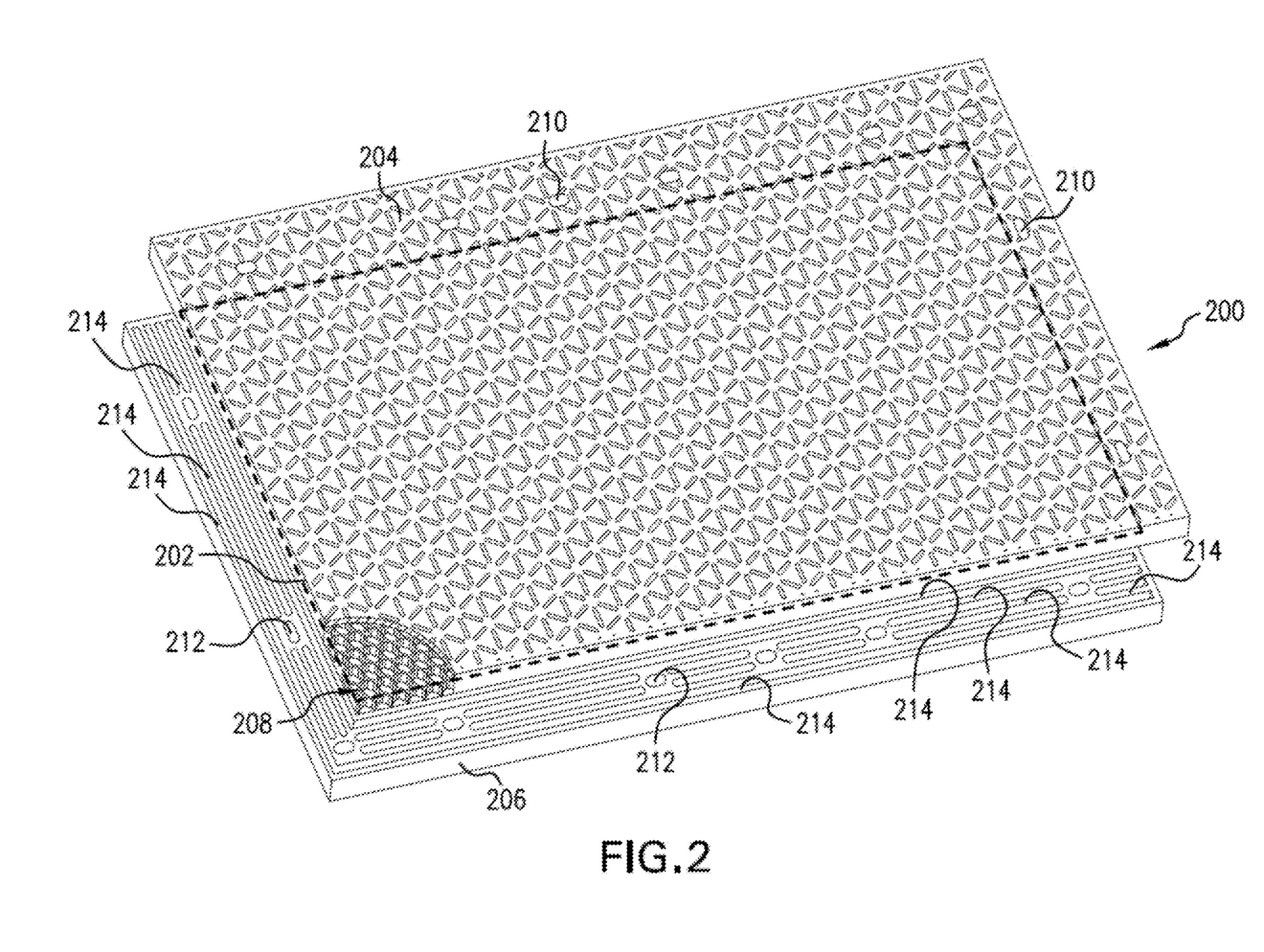
FIG. 2 an isometric illustration of a mat that may incorporate embodiments of the present disclosure, with a partial cutaway illustrating an interior structure of the mat.

Turning now to FIG. 2, a schematic illustration of a mat 200 in accordance with embodiments of the present disclosure is shown. The mat 200 may have a similar construction as that shown and described with respect to the mat 100 in FIGS. 1A-1B. The mat 200 may be made from a rigid material capable of withstanding compression forces, such as weights, vehicles, equipment, and/or other loads, positioned on the mat 200. In some non-limiting embodiments, the mat 200 may be constructed of a thermoplastic polymeric material, such as polyethylene or alkathene. In one or more embodiments, the mat 200 can be made of high-density polyethylene, medium-density polyethylene, low-density polyethylene, or mixtures thereof. In accordance with embodiments of the present disclosure, the material used to form the mat 200 may be a combination of recycled and new material, which may provide benefits over mats formed from 100% new material.

The mat 200 includes a main body 202, a first lip structure 204, and a second lip structure 206, with the first and second lip structures 204, 206 extending from the main body 202 as illustrated above. As described above, the first and second lip structures 204, 206 extend or cantilever from portions of the exterior surfaces of the main body 202. The lip structures 204, 206 each include respective pin apertures 210, 212 to enable connection to and joining of two adjacent mats. The lip structures 204, 206 may also include respective rib structures 214 (only shown for the second lip structure 206 in this illustration) which may be aligned (e.g., top to bottom) or misaligned with a similar ribbed structure of an adjacent mat when two mats are arranged adjacent to each other and connected by locking pins.

The main body 202 includes an interior support structure 208. The interior support structure 208 is configured to provide strength to the mat 200, such as crush strength. The interior support structure 208 may be a combination of voids and ribs that are encapsulated by exterior surfaces of the main body 202. Thus, the interior support structure 208 can permit a reduction in weight as compared to a solid body structured mat.

The interior support structure 208 of the main body 202, may be, in some configurations, an interconnected web structure such as in a honeycomb or other geometric pattern, which may be a repeating pattern of the same geometric shape. As noted, the interior support structure 208 defines voids within the main body 202.

Multiple mats may be joined together by overlaying lip structures 204, 206 of one mat with lip structures of an adjacent mat, and aligning the pin apertures 210, 212 of the two mats. A pin may then be inserted into the pin apertures to join the two mats together. Non-limiting examples of such locking pins may be found in U.S. Pat. No. 8,388,291, entitled "Mat Lock Pin," granted Mar. 5, 2013, and U.S. Pat. No. 11,378,118, entitled "Fencing Pin Anchor," granted Jul. 5, 2022, both commonly owned and incorporated by reference in their entireties. The pins of these systems provide secure locking mechanisms for joining mats together. However, once joined, the assembled mats are not easily moved, and typically disassembly and separation is required to enables movement of the working surface.

Embodiments of the present disclosure are directed to pins for joining mats to form work surfaces or structural surfaces, with the pins having wheels that and be deployed and allow for movement of mats. The wheels may be integrated or integral with the pins. For example, locking pins, in accordance with embodiments disclosed herein, may be used to securely join two or more mats together and/or can be actuated to deploy a wheel to permit movement of the work surface.

Figure 3A:
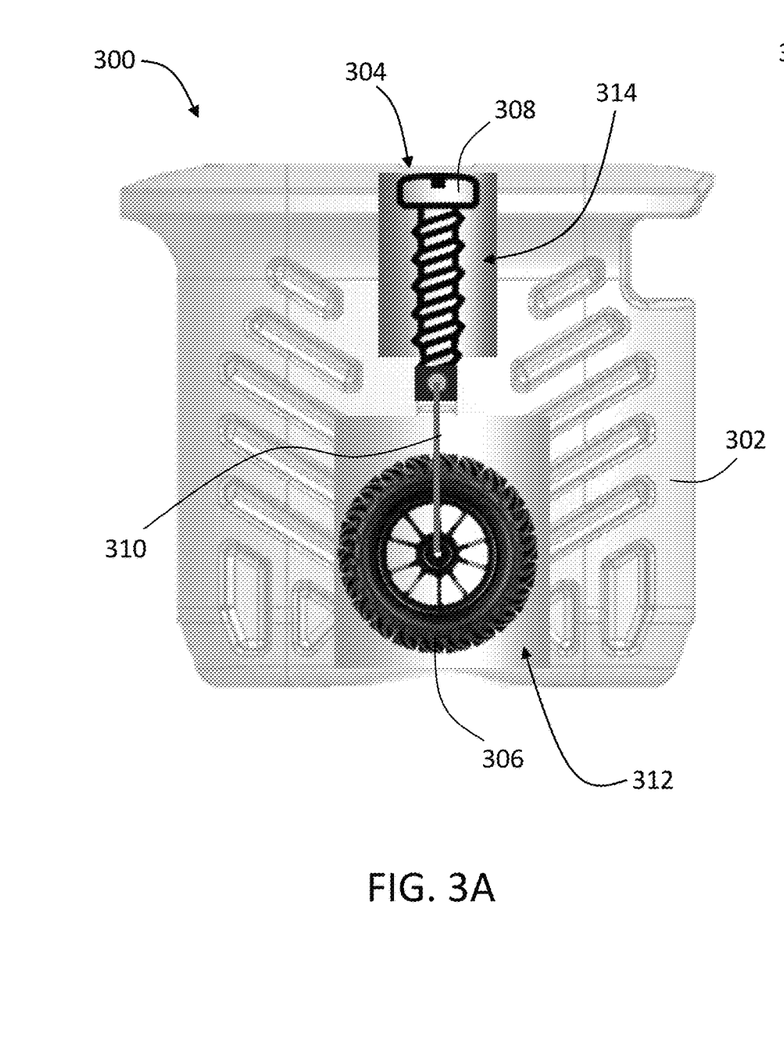
FIG. 3A is a schematic illustration of a wheeled pin for joining mats together in accordance with an embodiment of the present disclosure, shown in a first position.
Figure 3B:
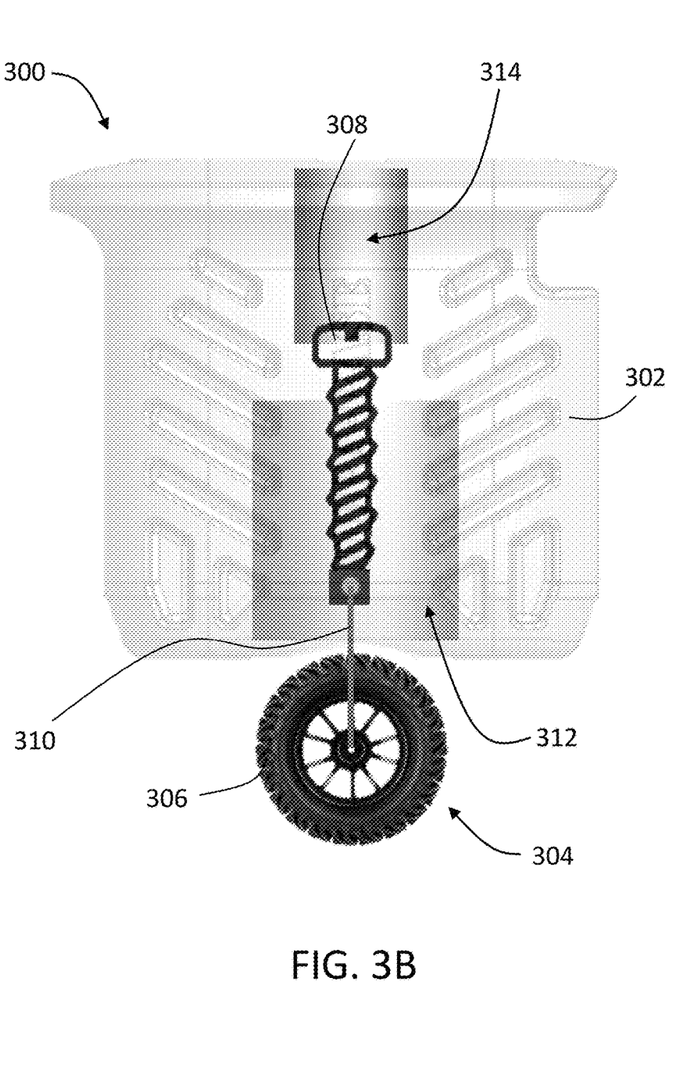
FIG. 3B is a schematic illustration of the wheeled pin of FIG. 3A shown in a second position.

Referring now to FIGS. 3A-3B, schematic illustrations of a wheeled pin 300 in accordance with an embodiment of the present disclosure are shown. The wheeled pin 300 includes a pin body 302 and a wheel assembly 304. FIG. 3A illustrates the wheel assembly 304 in a first position (e.g., retracted position) and FIG. 3B illustrates the wheel assembly 304 in a second position (e.g., deployed position). Accordingly, the wheel assembly 304 may move with respect to the pin body 302 from the first position to the second position. The pin body 302 may be constructed to be inserted into a pin aperture of two mats to securely join the two mats together. In accordance with some embodiments, installation of the wheeled pin 300 may be performed when the wheel assembly 304 is in the first position (FIG. 3A) or in the second position (FIG. 3B). The wheeled pin 300 may operate to securely join two mats together similar to other pins without the wheel assembly 304. In some configurations, mays may be secured together with only some pings including the wheel assembly 304.

As shown in FIGS. 3A-3B, the wheel assembly 304 includes a wheel 306 that is coupled to an actuator 308 by a linking connection 310. The wheel 306 may be housed within a wheel cavity 312 that is defined within an interior of the pin body 302. The wheel cavity 312 may be defined by a channel guide or structure within the pin body 302, such as a metallic channel or slot. When housed within the wheel cavity 312 (FIG. 3A), the wheeled pin 300 is substantially similar to non-wheeled pins, providing a mechanical connection between two mats. However, rather than disassembling the two mats for moving the structural surface, the wheeled pin 300 may be operated to deploy the wheel 306.

As shown in FIGS. 3A-3B, the wheeled pin 300 includes the actuator 308 arranged within an actuator cavity 314. The actuator 308 is configured to move the wheel assembly 304 from the first position to the second position. In this illustrative, non-limiting embodiment, the actuator 308 is configured as a threaded component (e.g., screw, bolt, etc.) that is coupled to the wheel 306 by the linking connection 310. In an embodiment where the actuator 308 is a threaded component, the actuator cavity 314 may include a threaded sleeve that is arranged within the pin body 302. The linking connection 310 may be a rod, shaft, or the like. As the actuator 308, in this embodiment, is rotated and threaded downward or into the pin body 302 (e.g., within the actuator cavity 314), the wheel assembly 304 moves from the first position to the second position. Specifically, the actuator 308 can apply downward force to the linking connection 310 to, in turn, apply force to urge or push the wheel 306 out of the wheel cavity 312 and extend from wheeled pin 300, as shown in FIG. 3B.

With the wheel 306 deployed at the second position and the pin body 302 engaged with two mats, the wheeled pin 300 (e.g., in concert with multiple other wheeled pins) can cause separation of the mats from the ground surface. In one or more embodiments, the wheel 306 can lift the joined mats off the ground surface and then permit the joined mats to be moved by rolling of the wheels 306. Once the mats are moved to a new location, the actuator 308 may be reversed to move the wheel 306 to the first position. For example, the actuator 308 can be operated in reverse to move the wheel 306 into the wheel cavity 312. At the first position, the mats can then rest back on the ground surface.

Figure 4A:
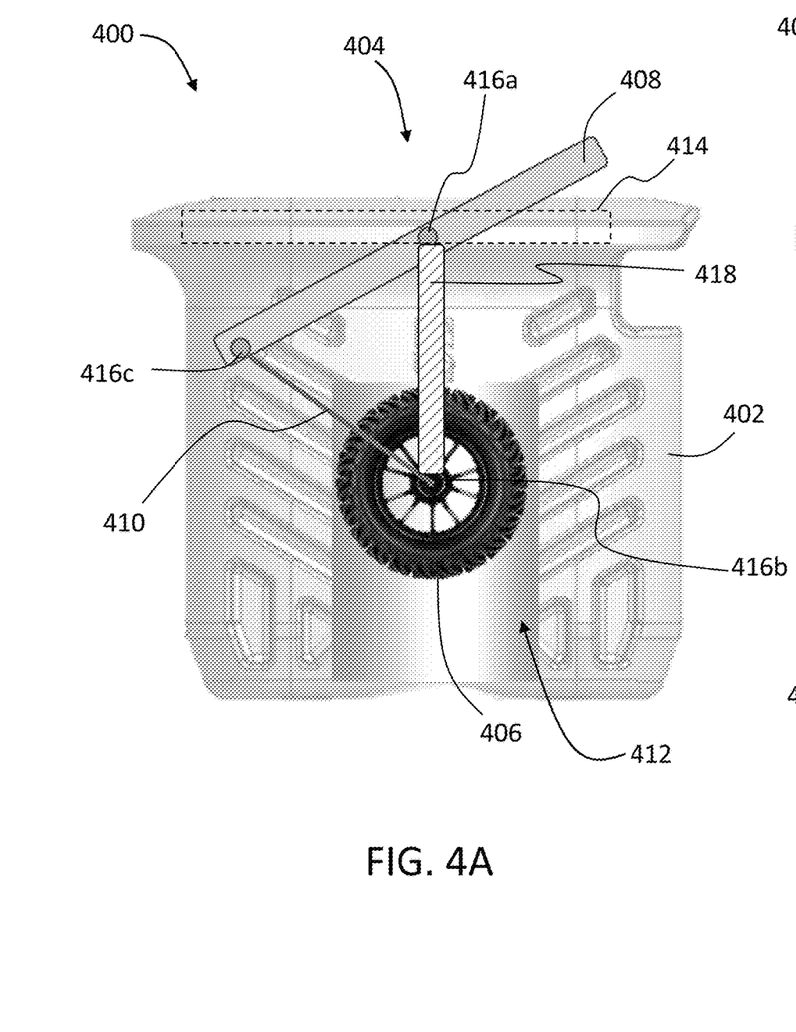
FIG. 4A is a schematic illustration of a wheeled pin for joining mats together in accordance with an embodiment of the present disclosure, shown in a first position.
Figure 4B:
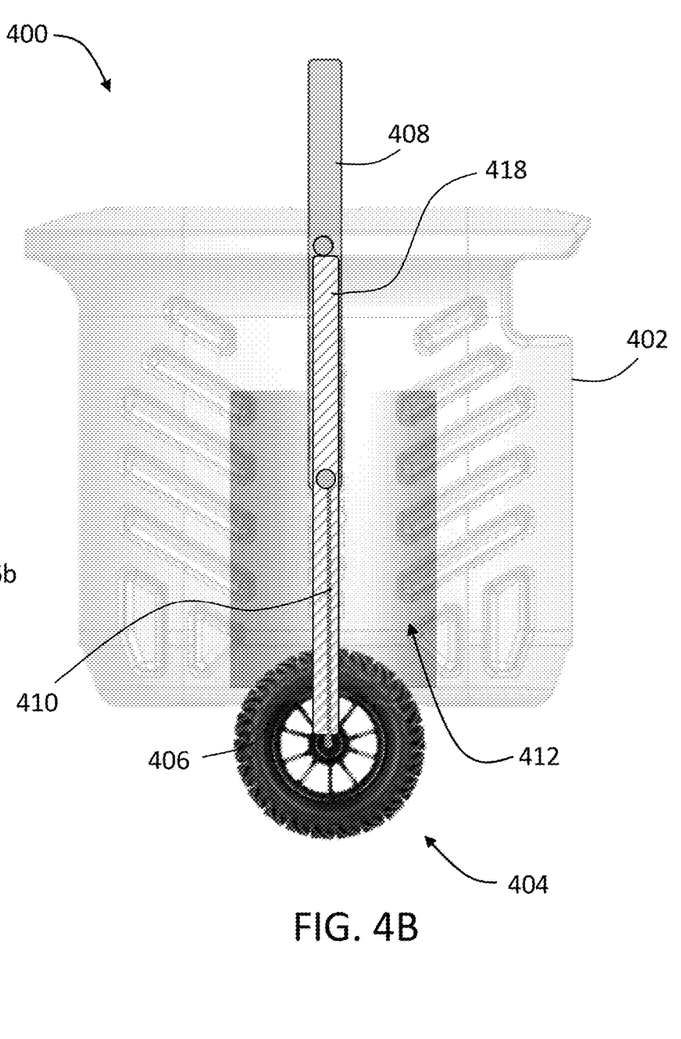
FIG. 4B is a schematic illustration of the wheeled pin of FIG. 3A shown in a second position.

Referring now to FIGS. 4A-4B, schematic illustrations of a wheeled pin 400 in accordance with an embodiment of the present disclosure are shown. The wheeled pin 400 includes a pin body 402 and an integrated wheel assembly 404. FIG. 4A illustrates the wheel assembly 404 in a first position (e.g., retracted position) and FIG. 4B illustrates the wheel assembly 404 in a second position (e.g., deployed position). The pin body 402 may be constructed to be inserted into a pin aperture of two mats to securely join the two mats together, similar to that described herein. Similar to the configuration shown in FIGS. 3A-3B, the wheel assembly 404 includes a wheel 406 that is coupled to an actuator 408 by a linking connection 410. The wheel 406 may be housed within a wheel cavity 412 that is defined within an interior of the pin body 402.

To transition the wheel 406 from the first position (FIG. 4A) to the second position (FIG. 4B), the actuator 408 may be operated to translate the wheel 406 from the stowed or retracted position (FIG. 4A) to the deployed or extended position (FIG. 4B). In this illustrative, non-limiting embodiment, the actuator 408 is configured as a lever or rotating/pivoting arm that is coupled to the wheel 406 by the linking connection 410. The pin body 402 may include a channel or actuator cavity through which the actuator 408 may rotate. As the actuator 408 is rotated or pivoted, it can apply a force to the linking connection 410 and can apply force to urge or push the wheel 406 out of the wheel cavity 412 and to extend out of the wheeled pin 400, as shown in FIG. 4B.

In accordance with some embodiments, the pin body 402 may include an actuator storage 414 that can house the actuator 408 of the wheel assembly 404 in the pin body 402. As such, when the wheel 406 is in the first position (FIG. 4A), the actuator 408 may be contained within the pin body 402 and may not protrude therefrom. As such, the actuator 408 can avoid providing a potential trip hazard or the like when the wheel assembly 404 is in the first position (e.g., stowed or retracted position), as shown in FIG. 4A.

In this illustrative embodiment, the wheel assembly 404 may include multiple pivots 416a-c. For example, the actuator 408 includes a first pivot 416a about which the arm-like structure of the actuator 408 may pivot. The wheel 406 may include a second pivot 416b which may be an axle-type structure to cause translation of the wheel 406 through the wheel cavity 412. The linking connection 410 may operably couple to the wheel 406 at the second pivot 416b. A third pivot 416c may be provided between the actuator 408 and the linking connection 410, at an end of the linking connection 410 opposite the second pivot 416b. In this configuration, the wheel cavity 412 may be defined by a slotted tube or other slotted structure through which the linking connection 410 and a portion of the actuator 408 may travel, between the first position (FIG. 4A) and the second position (FIG. 4B).

In some embodiments, and illustratively shown in FIG. 4A, a biasing member 418 may be coupled between the first pivot 416a and the second pivot 416b. The biasing member 418 may be a spring or other similar element. The biasing member 418 may provide stiffness and/or a biasing force to the wheel 406. For example, in the first position (FIG. 4A), the biasing member 418 may be maintained in a compressed state, and then in the second position (FIG. 4B), the biasing member 418 may provide a leveling feature for a mat having multiple wheeled pins 400 installed therein. That is, when multiple wheeled pins 400 are used, the biasing members 418 can provide leveling, shock absorption, or the like, during movement of a connected mat structure.

Figure 5A:
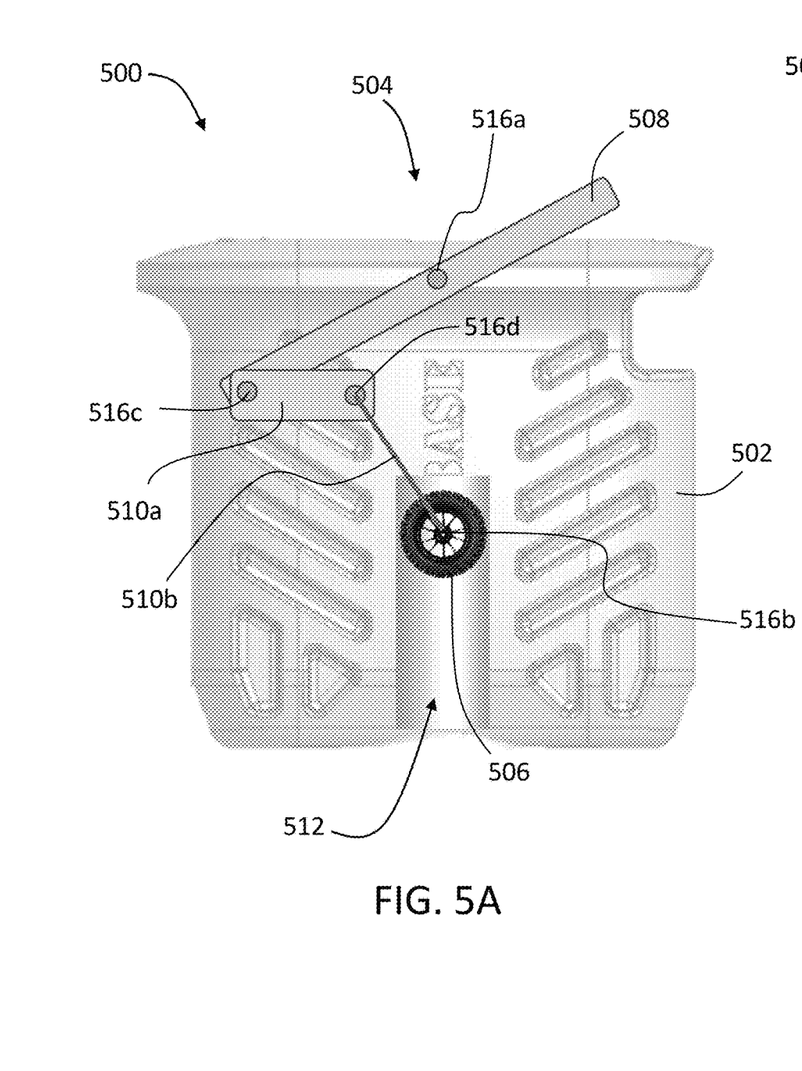
FIG. 5A is a schematic illustration of a wheeled pin for joining mats together in accordance with an embodiment of the present disclosure, shown in a first position.
Figure 5B:
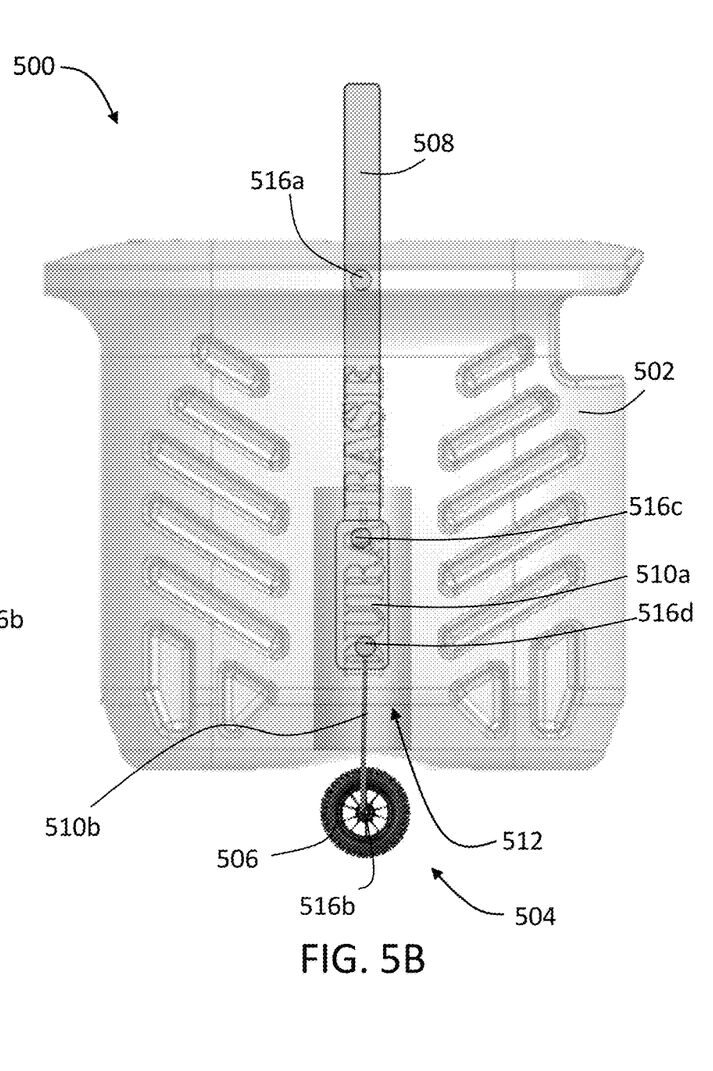
FIG. 5B is a schematic illustration of the wheeled pin of FIG. 3A shown in a second position.

Referring now to FIGS. 5A-5B, schematic illustrations of a wheeled pin 500 in accordance with an embodiment of the present disclosure are shown. The wheeled pin 500 includes a pin body 502 and a wheel assembly 504. FIG. 5A illustrates the wheel assembly 504 in a first position (e.g., retracted position) and FIG. 5B illustrates the wheel assembly 504 in a second position (e.g., deployed position). The pin body 502 may be constructed to be inserted into a pin aperture of two mats to securely join the two mats together, similar to that described herein. Similar to the configuration shown above, the wheel assembly 504 includes a wheel 506 that is coupled to an actuator 508 by one or more linking connections 510a-b. The wheel 506 may be housed within a wheel cavity 512 that is defined within an interior of the pin body 502.

To transition the wheel 506 from the first position (FIG. 5A) to the second position (FIG. 5B), the actuator 508 may be operated to translate the wheel 506 from the first position (FIG. 5A) in which the wheel 506 is stowed or retracted within the pin body 502 to the second position (FIG. 5B) in which the wheel 506 is deployed or extended from the pin body 502. In this illustrative, non-limiting embodiment, the actuator 508 is configured as a lever or rotating/pivoting arm that is coupled to the wheel 506 by a first linking connection 510a and a second linking connection 510b. The pin body 502 may include a channel or actuator cavity through which the actuator 508 and the linking connections 510a, 510b may rotate. As the actuator 508 is rotated or pivoted, the actuator 508 can apply a force to the linking connections 510a, 510b and to urge or push the wheel 506 out of the wheel cavity 512 and to extend out of the wheeled pin 500, as shown in FIG. 5B. Although not shown, the pin body 402 may include an actuator storage or the like, similar to that shown and described above.

In this illustrative embodiment, the wheel assembly 504 may include multiple pivots 516a-d. For example, the actuator 508 includes a first pivot 516a about which the arm-like structure of the actuator 508 may pivot. The wheel 506 may include a second pivot 516b which may be an axle-type structure to cause translation of the wheel 506 through the wheel cavity 512. The first linking connection 510a may be operably coupled to the actuator 508 at a third pivot 516c, and the second linking connection 510b may be operably coupled to the first linking connection 510a at a fourth pivot 516d. The second linking connection 510b may be operably coupled to the wheel 506 at the second pivot 516b. In this configuration, the wheel cavity 512 may be defined by a slotted tube or other slotted structure through which the linking connection 510 and a portion of the actuator 508 may travel, between the first position (FIG. 5A) and the second position (FIG. 5B).

Figure 6:
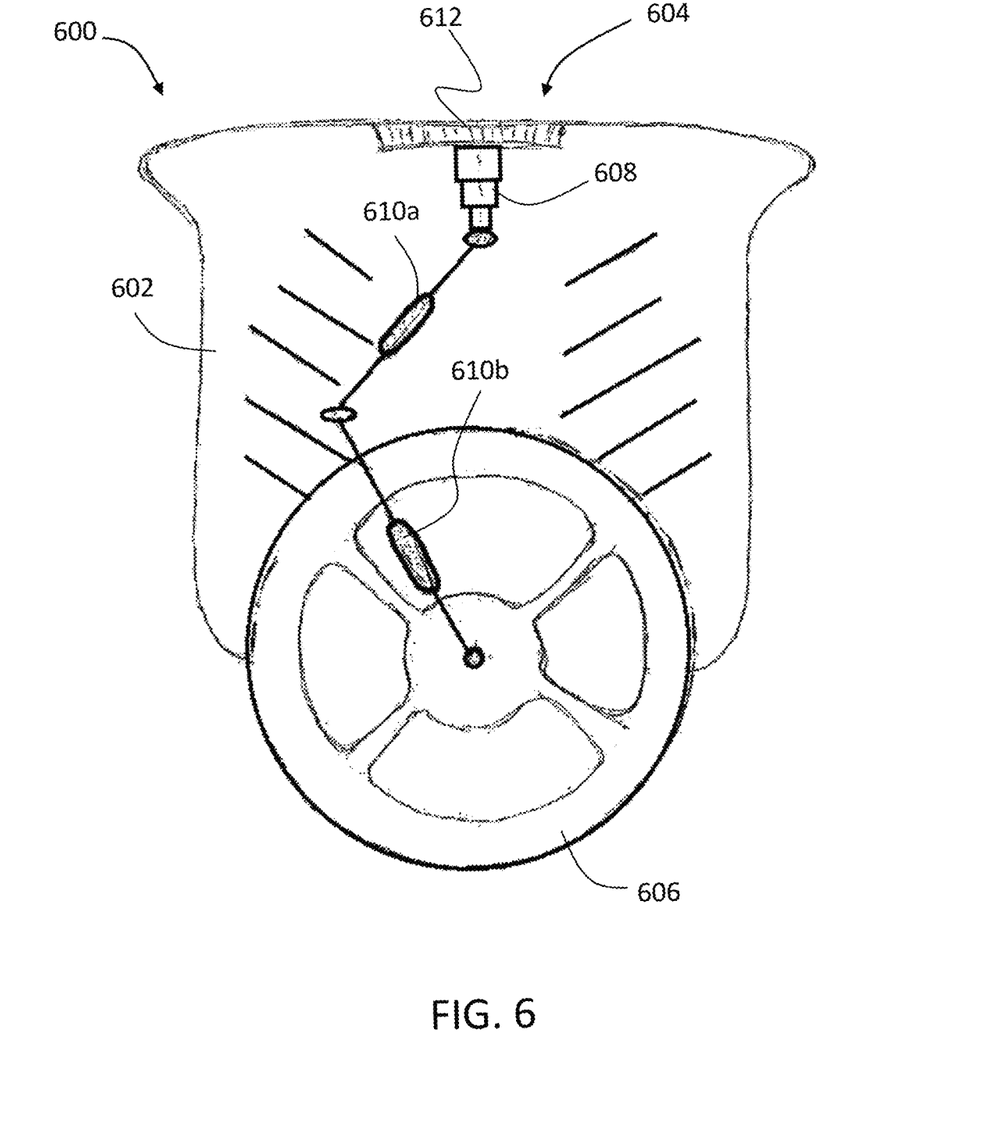
FIG. 6 is a schematic illustration of a wheeled pin for joining mats together in accordance with an embodiment of the present disclosure, shown in a first position.

Referring now to FIG. 6, a schematic illustration of a wheeled pin 600 in accordance with an embodiment of the present disclosure are shown. The wheeled pin 600 includes a pin body 602 and a wheel assembly 604. The wheel assembly 604 may be moveable between a first position where a wheel 606 of the wheel assembly 604 is stowed or housed within the pin body 602 and a second position where the wheel 606 is extended from the pin body 602 to contact with a ground surface of the like, as described herein. The illustration of FIG. 6 shows the wheel 606 in the extended or deployed position. The wheel assembly 604 includes the wheel 606 that is coupled to an actuator 608 by a first linking connection 610a and a second linking connection 610b, similar to the configuration shown in FIGS. 5A-5B. The wheel 606 may be housed within a wheel cavity that is defined within an interior of the pin body 602.

In this configuration, the actuator 608 includes a control element 612, such as a knob or dial. The control element 612 is arranged in or on the pin body 602, such as opposite of the wheel 606, and provides for manual movement and operation of the wheel assembly 604. As the control element 612 is rotated, the actuator 608 may be extended or retracted (e.g., as a telescoping component) and apply force to extend or retract the linking connections 610a-b and thus the wheel 606.

Figure 7A:
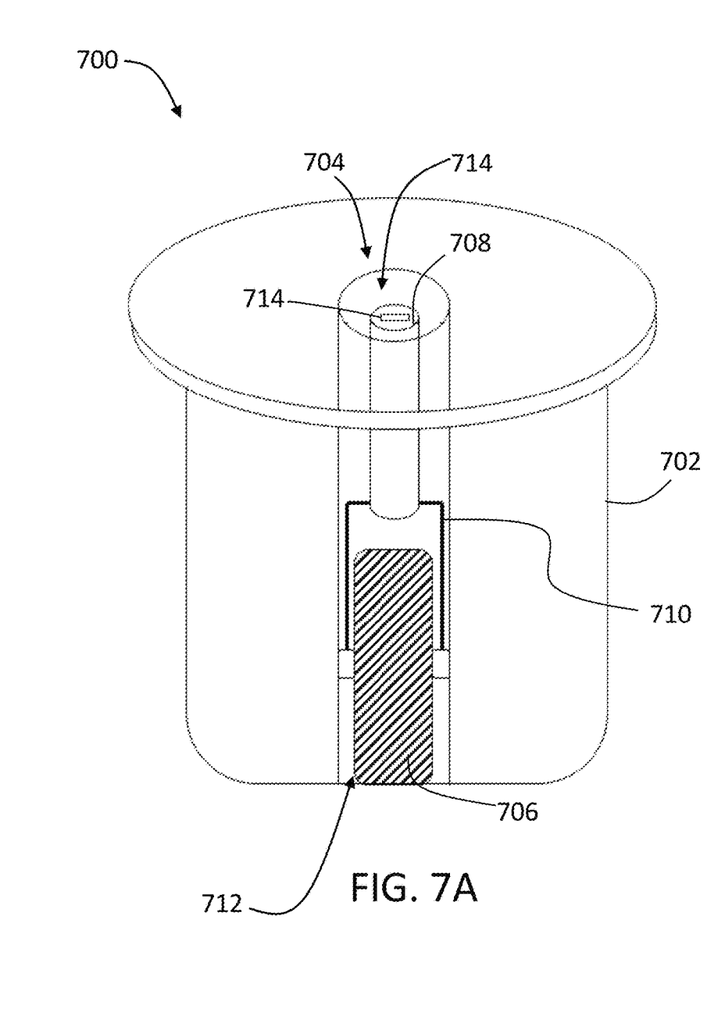
FIG. 7A is a schematic illustration of a wheeled pin for joining mats together in accordance with an embodiment of the present disclosure, shown in a first position.
Figure 7B:
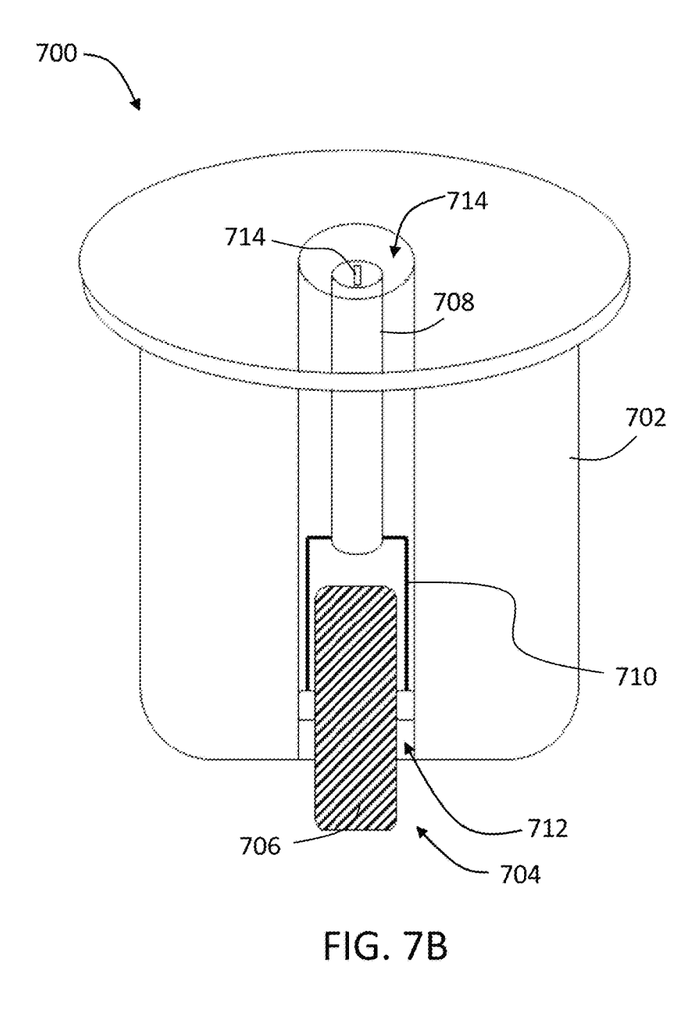
FIG. 7B is a schematic illustration of the wheeled pin of FIG. 3A shown in a second position.

Referring now to FIGS. 7A-7B, schematic illustrations of a wheeled pin 700 in accordance with an embodiment of the present disclosure are shown. The wheeled pin 700 includes a pin body 702 and a wheel assembly 704. FIG. 7A illustrates the wheel assembly 704 in a first position (e.g., retracted position) and FIG. 7B illustrates the wheel assembly 704 in a second position (e.g., deployed position). The wheel assembly 704 includes a wheel 706 that is coupled to an actuator 708 by one or more linking connections 710. The wheel 506 may be housed within a wheel cavity 712 and the actuator 708 may be housed within an actuator cavity 714 that is defined within an interior of the pin body 702.

To transition the wheel 706 from the first position (FIG. 7A) to the second position (FIG. 7B), the actuator 708 may be operated to translate the wheel 706 from the stowed or retracted position (FIG. 7A) to the deployed or extended position (FIG. 7B). The actuator 708 includes an indicator 714 that may be indicative of an orientation or state of the wheel assembly 704. In some embodiments, the indicator 714 is an engageable portion of the actuator 708, such as a slot for receiving a head of a screw driver or other tool. The slot of the indicator 714 may be in a first position (FIG. 7A) when the wheel 706 is in the first position and in a second position (FIG. 7B) when the wheel 706 is in the second position. When the indicator 714 is rotated from the first position to the second portion (e.g., 90 degree rotation), the actuator 708 may apply a downward translation force to urge the wheel 706 from the stowed position to the deployed position.

Although shown and described herein with a limited number configurations, those of skill in the art will appreciate that alternative configurations, mechanisms, and components may be employed without departing from the scope of the present disclosure. For example, the actuators of the wheeled pins may be arranged in any structural configuration that is configured to translate one force into an axial or translation force to urge the wheel downward and out of the pin. For example, screw-and-nut systems for configured for converting rotational motion to linear motion may be arranged within the pin body to provide the functionality described herein. Various other linear actuators may be employed without departing from the scope of the present disclosure. In some embodiments, a bearing configuration may be employed, with bearings arranged on ramped or sloped surfaces between two plates, and a rotation of a top plate may force the bearings along the ramps to cause linear translation of a wheel that is coupled to a bottom plate. Further, in some embodiments, the wheel may be arranged on a push rod or the like, where a user may push downward upon a top of the rod to cause translation of the wheel attached thereto.

Further, the wheeled pins described herein may include locking mechanisms to ensure that the wheel assembly is maintained in the correct position during use. In some embodiments, such as including a lever arm (e.g., FIGS. 4A-4B, 5A-5B), the lever arm may be locked into an actuator storage. In the configurations having threaded elements (e.g., FIGS. 3A-4B), the threading may include a detent or the like to secure the actuator in the first or second positions. In the configuration of FIGS. 6 and 7A-7B, the rotating component may have a lock element at each end of the complete rotation, to secure the actuator in the respective positions.

Figure 8A:
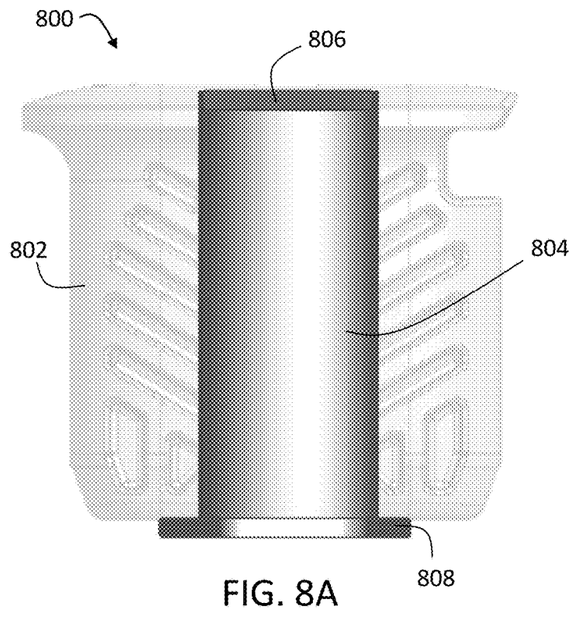
FIG. 8A is a schematic illustration of a wheeled pin in a first position as viewed from a first side.
Figure 8B:
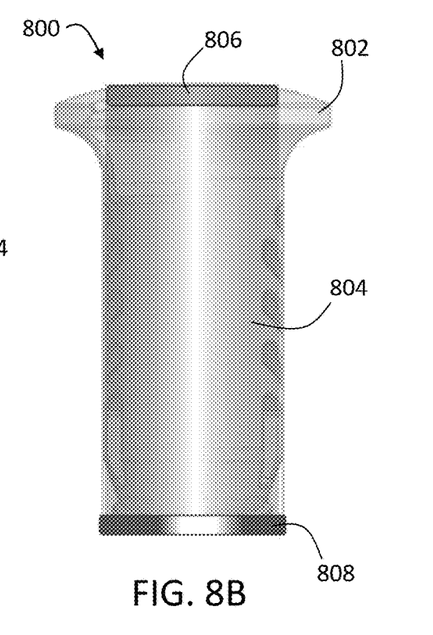
FIG. 8B is a schematic illustration illustrating a second side of the wheeled pin of FIG. 8A in the first position.
Figure 8C:
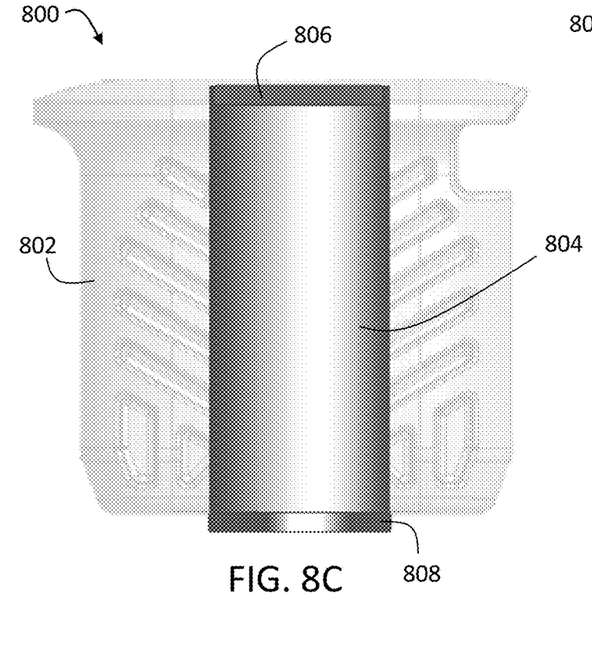
FIG. 8C is a schematic illustration illustrating the first side of the wheeled pin of FIG. 8A shown in a second position.
Figure 8D:
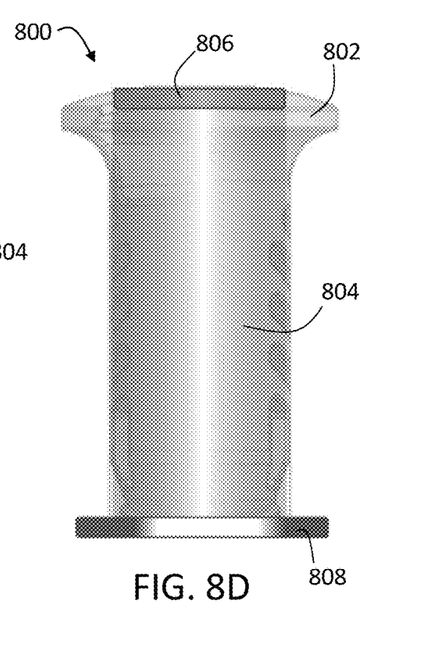
FIG. 8D is a schematic illustration illustrating the second side of the wheeled pin of FIG. 8A in the second position.

Turning now to FIGS. 8A-8D, schematic illustrations of a wheeled pin 800 in accordance with an embodiment of the present disclosure are shown. The wheeled pin 800 includes a pin body 802 and a wheel assembly 804. The wheel assembly 804 is schematically represented as a generic structure within the pin body 802, and those of skill in the art will appreciate that the wheel assembly 804 may take any configuration with a wheel that is moveable between a first position (e.g., stowed) and a second position (e.g., deployed), such as shown and described herein. FIGS. 8A and 8B illustrate the wheeled pin 800 in a first position (e.g., wheel is retracted) and FIGS. 8C and 8D illustrate the wheeled pin 800 in a second position (e.g., wheel is deployable).

In the configurations shown in FIGS. 8A-8D, the wheel assembly 804 includes an actuator 806 and an optional locking plate 808. In this illustrative configuration, the actuator 806 and the locking plate 808 are arranged at opposite ends of the wheel assembly 804. When the wheeled pin 800 is installed to a mat assembly, the actuator 806 may be accessible from the top or working surface of the mat assembly, and the locking plate 808 may be arranged to contact a lower or bottom surface of the mat assembly. The actuator 806 is configured to operate the wheel assembly 804, as described above, and may include an additional feature or structure to operate or rotate the locking plate 808.

The locking plate 808 may be configured as an oblong or oval plate that has a geometry similar to a cross-sectional geometry of the pin body 802. Accordingly, as shown in FIGS. 8A and 8B, the locking plate 808, in the first position of the wheeled pin 800, is substantially aligned with an orientation of the pin body 802. That is, a long axis and a short axis of the locking plate 808 are aligned with a long axis and a short axis of the pin body 802. FIGS. 8C and 8D illustrate the wheeled pin 800 in the second position, with the locking plate 808 rotated relative to the pin body 802. As shown in FIG. 8D, a portion of the locking plate 808 will extend outward from the pin body 802 forming a land or stop for engagement with a surface of mat through which the wheeled pin 800 is installed. The locking plate 808 may thus provide an engagement surface for engaging with the mat when moving the wheeled pin 800 from the first position to the second position. The locking plate 808 may have an opening, aperture, or through hole that is sized and shaped to permit, at least, a wheel of the wheel assembly 804 to pass through the locking plate 808.

In some embodiments, the rotation of the locking plate 808 and the deployment of the wheel assembly 804 to the deployed state may occur substantially simultaneously, with rotation of the plate 808 occurring as the wheel is deployed during a single actuation of the actuator 806. In other embodiments, the actuator 806 may be configured as a two-part or two-step system, with a first part or first actuation configured to cause rotation of the locking plate 808 and a second part or second actuation to cause deployment of the wheel of the wheel assembly 804. In operation, with the locking plate 808 set in the second position (FIGS. 8C and 8D), the wheeled pin 800 will be held in place relative to the mat(s) and thus the wheeled pin 800 will be prevented from lifting up when the wheel is lowered for engagement with a surface.

Figure 9:
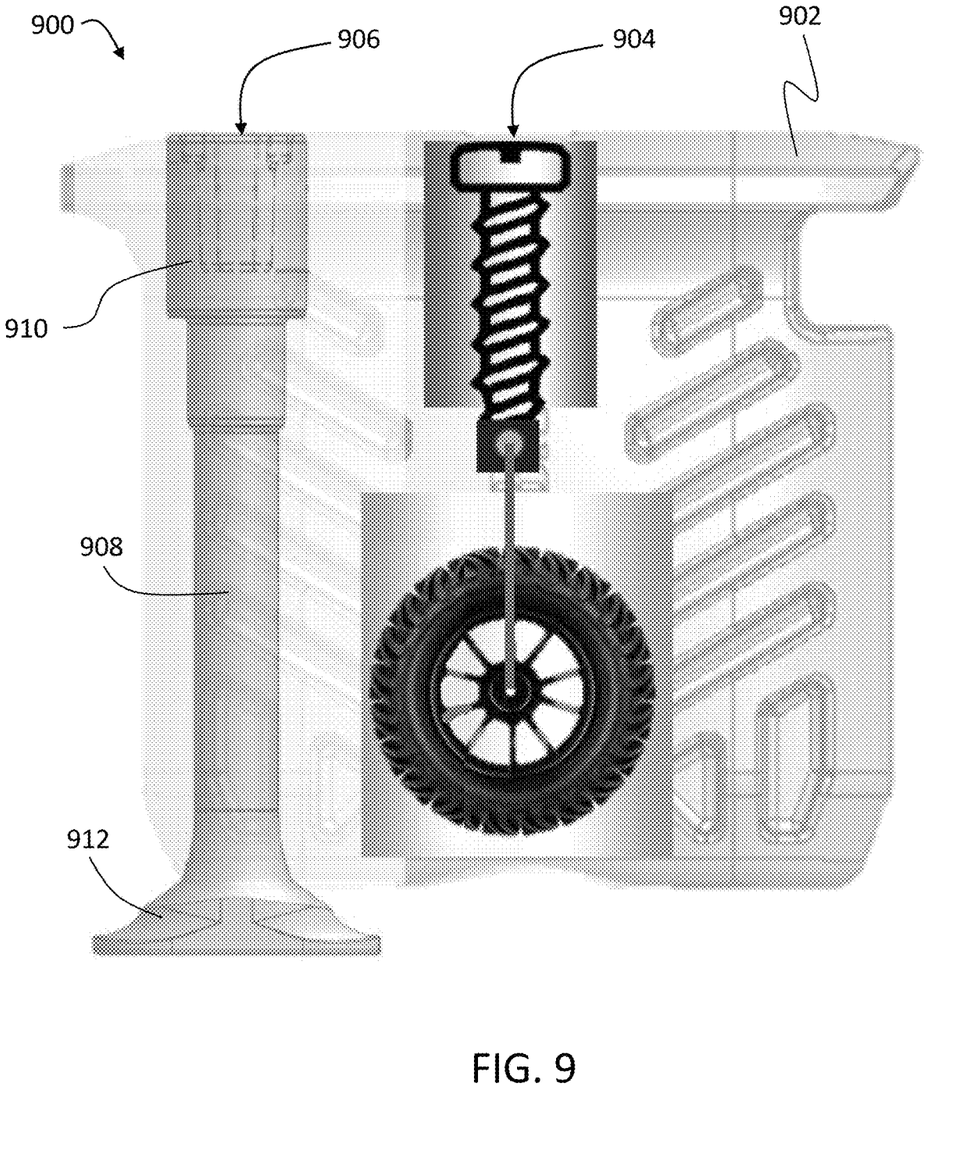

Referring now to FIG. 9, a schematic illustration of a wheeled pin 900 in accordance with an embodiment of the present disclosure are shown. The wheeled pin 900 includes a pin body 902, a wheel assembly 904, and a rotor 906. The pin body 902 and the wheel assembly 904 may be configured as illustratively shown or may be interchanged with any of the other described wheel configurations shown and described herein and variations thereon.

The rotor 906 includes a stem 908 joining a rotor head 910 and a rotor foot 912 at either end of the stem 908. The rotor head 910 includes a turning feature to permit a tool (e.g., wrench, screwdriver, allen wrench, etc.) to connect to and turn the rotor 906. The rotor foot 912, in conjunction with stem 908, operate as structural elements which serve to lock adjoining mats together, by forcing the mats together. Examples of rotors for use in pins for mats are illustrated and described in U.S. Pat. No. 8,388,291, entitled "Mat Lock Pin," granted Mar. 5, 2013, and U.S. Pat. No. 11,378,118, entitled "Fencing Pin Anchor," granted Jul. 5, 2022, both commonly owned and incorporated by reference in their entireties. In contrast to the configurations of these patented pin systems, the pin body 902 includes two through-holes, apertures, or cavities for receiving each of the wheel assembly 904 and the rotor 906. In this configuration, the rotor 906 may be operated similar to that described in the patents, with rotation at the rotor head 910 causing rotation of the rotor foot 912 and thus engage two mats together. Because of the inclusion of the wheel assembly 904, the rotor 906 may be offset from the center of the pin body 902. In this configuration, as compared to that shown in FIGS. 8A-8D, an engagement with mats is provided by the rotor 906 and the wheel assembly 904 is deployable to permit movement of joined mats that may be held together, in part, by the rotor 906.

Figure 10:
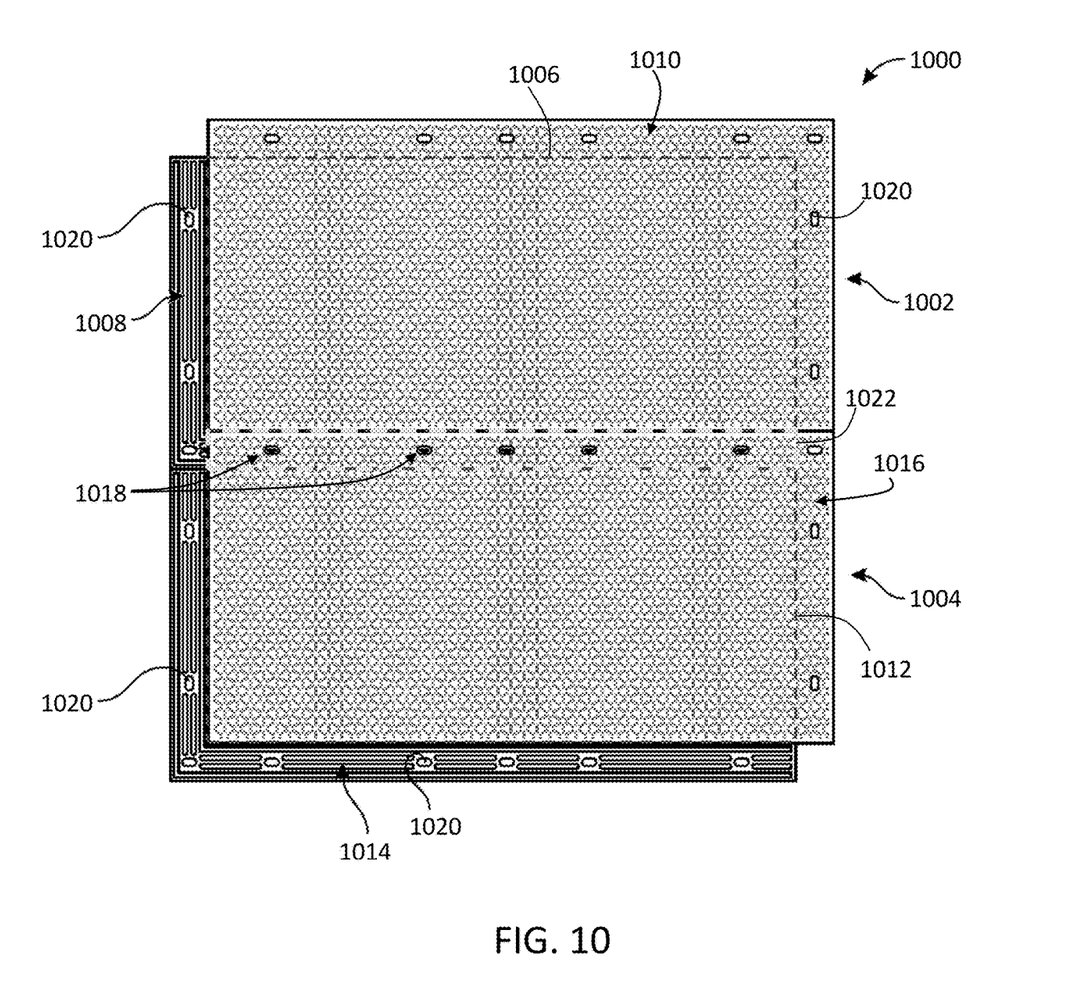
FIG. 10 is a schematic illustration of a mat assembly of two joined mats that may incorporate embodiments of the present disclosure.

Turning now to FIG. 10, a schematic illustration of a mat assembly 1000 that can incorporate embodiments of the present disclosure is shown. The mat assembly 1000 includes, in this illustration, two joined mats 1002, 1004. The mat assembly 1000 is a modular mat system which may incorporates additional mats joined to the two mats 1002, 1004 that are shown. A first mat 1002 of the mat assembly 1000 has a respective main body 1006 with lip structures 1008, 1010 extending therefrom. A second mat 1004 of the mat assembly 1000 has a respective main body 1012 with lip structures 1014, 1016 extending therefrom. The two mats 1002, 1004 are joined at overlapping lip structures 1008, 1016. Locking pins 1018 are inserted through aligned pin apertures 1020 of the two overlapping lip structures 1008, 1016. As such, a joined and overlapping portion 1022 is defined by a portion of the first mat 1002 and a portion of the second mat 1004. The overlapping portion 1022 has the same total thickness as each of the main body 1006 of the first mat 1002 and the main body 1012 of the second mat 1004. Each of the main bodies 1006, 1012 may have an interior support structure that includes voids and ribs that define the voids, in order to provide strength and rigidity while enabling a relatively light-weight total structure.

FIG. 10 is illustrative of the modular nature of the mats of the present disclosure. Multiple mats may be arranged together to define a continuous and connected support surface. Such support surface may be used to provide a firm and secure surface or ground upon which vehicles may be conveyed, equipment employed, etc. Although FIG. 10 illustrates only two mats arranged adjacent to each other, those of skill in the art will appreciate that any number of interlocking and arranged mats may be provided to form a desired support surface having a geometry based on the arrangement of the mats.

As shown, the locking pins 1018 are all arranged in a similar orientation. This is because the pin apertures 1020 may have an oblong geometry (i.e., non-circular) and thus have a long axis or dimension and a short axis or dimension. The pin apertures 1020 are typically aligned with the length dimension of the lip portion in which the pin aperture are present. For example, the pin apertures 1020 that are defined within the long side of the mats 1002, 1004 are oriented with the long dimension or long axis of the pin aperture parallel with the lip. At the corner locations (where the short and long lips meet), the pin aperture may be aligned with the long dimension, as shown in FIG. 10.

The pin apertures 1020 may include the locking pins 1018 for sections (lip structures) of the mats 1002, 1004 that overlap and thus secure the two mats together. In some embodiments, one or more of the locking pins 1018 may be a wheeled pin, as shown and described above. During normal use as a structural or work surface, the wheels of the wheeled pins are retracted (first position). However, if it is desired to move the structural or work surface, rather than disassembling the mats from each other, the wheels of the wheeled pins may be deployed (second position), which will cause the mats to lift and then may be rolled on the wheels to a new location. In some embodiments, all locking pins may be wheeled pins, and only those pins that are required for the desired movement may be actuated or deployed. For example, with reference to FIG. 10, to move in a direction of the long length, only those wheeled pins oriented in the correct direction will be deployed and those not oriented in the correct direction will remain stowed and operate as a conventional locking pin to hold together the mats during the movement.

Figure 11A:
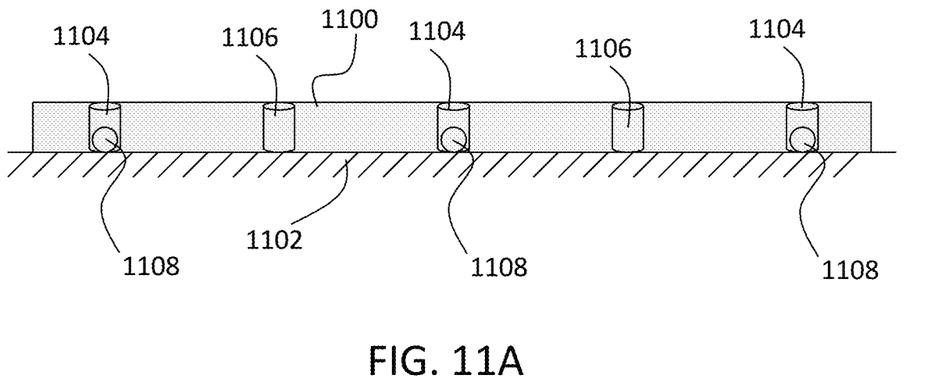
FIG. 11A illustrates a mat in accordance with an embodiment of the present disclosure in a first position.
Figure 11B:
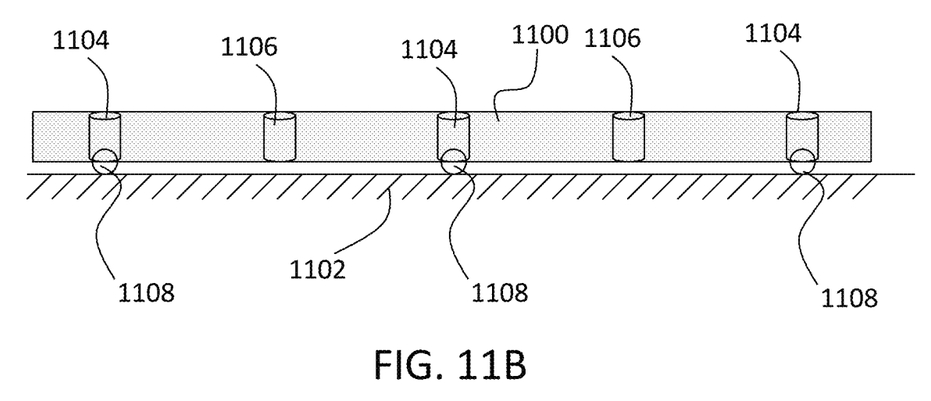
FIG. 11B illustrates the mat of FIG. 11B in a second position.

Referring now to FIGS. 11A-11B, schematic illustrations of a mat system 1100 arranged on the ground 1102 are shown. FIG. 11A illustrates the mat 1100 in a first position, such as when defining a working or structural surface. The mat system 1100 may be formed of multiple different mats that are secured together using a plurality of locking pins 1104, 1106. In this illustrative configuration, three of the five shown locking pins are wheeled pins 1104 and the two remaining locking pins 1106 are non-wheeled pins. In the first position (FIG. 11A), both types of locking pins 1104, 1106 provide the same functionality, to secure multiple mats together. In this position, wheels 1108 of the wheeled pins 1104 are housed within the respective pin bodies. When it is desired to move the mat system 1100, the wheeled pins 1104 may be actuated to deploy the wheels 1108 such that they extend below the mat system 1100 and raise the mat system 1100 off the ground 1102, as shown in FIG. 11B. With the wheels 1108 deployed, the wheeled pins 1104 and the locking pins 1106 hold the mats of the mat system 1100 together, and the wheels 1108 provide element upon which the mat system 1100 may be moved.

Advantageously, embodiments described herein provide for wheeled pins that may be used to convert conventionally stationary mats into selectively mobile mats. The wheeled pins may take various forms to enable deployment of wheels for movement of the mats. As such, advantageously, embodiments of the present disclosure provide for mat systems that are mobile as an assembled system, rather than requiring disassembly of the mat system.

The use of the terms "a", "an", "the", and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other. As used herein, the terms "about" and "substantially" are intended to include the degree of error associated with measurement of the particular quantity based upon the equipment available at the time of filing the application. For example, the terms may include a range of ±8%, or 5%, or 2% of a given value or other percentage change as will be appreciated by those of skill in the art for the particular measurement and/or dimensions referred to herein.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. A mat locking pin comprising:
a pin body configured to be installed into pin apertures to secure multiple mats together; and
a wheel housed within the pin body, the wheel configured to be movable from a first position to a second position, wherein in the first position the wheel is housed within the pin body and in the second position at least a portion of the wheel extends from the pin body.

2. The mat locking pin of claim 1, wherein the pin body is configured to be inserted into respective aligned pin apertures of a first mat and a second mat to secure the first mat to the second mat.

3. The mat locking pin of claim 1, further comprising an actuator operably coupled to the wheel, wherein actuation of the actuator causes the wheel to move between the first position and the second position.

4. The mat locking pin of claim 3, wherein the actuator comprises a threaded component that is rotatable to cause translation of the wheel between the first position and the second position.

5. The mat locking pin of claim 3, wherein the actuator comprises a lever arm.

6. The mat locking pin of claim 5, wherein the lever arm is pivotable about a pivot to cause rotation of the lever arm to be converted to translation movement of the wheel between the first position and the second position.

7. The mat locking pin of claim 3, wherein the actuator comprises an indicator configured to indicate a position of the wheel.

8. The mat locking pin of claim 3, wherein the actuator is at least partially housed within an actuator cavity defined within the pin body.

9. The mat locking pin of claim 8, wherein the actuator cavity comprises a threaded portion and the actuator comprises a corresponding threaded portion that engages with the threaded portion of the actuator cavity.

10. The mat locking pin of claim 3, further comprising a biasing member coupling the actuator to the wheel.

11. The mat locking pin of claim 1, further comprising a rotor arranged within the pin body and configured to move from a first position to a second position of the rotor, wherein in the second position the rotor is configured to secure a first mat to a second mat.

12. The mat locking pin of claim 1, further comprising a wheel cavity defined within the pin body, wherein the wheel is housed within the wheel cavity and movable from within the wheel cavity in the first position to at least partially extended from the wheel cavity in the second position.

13. A mat system comprising:
a first mat comprising a first lip structure having a plurality of pin apertures defined in the first lip structure;
a second mat comprising a second lip structure having a plurality of pin apertures defined in the second lip structure, wherein the first lip structure is configured to overlap the second lip structure and at least one pin aperture of the first lip structure aligns with at least one pin aperture of the second lip structure to define an aligned pin aperture; and
a wheeled pin inserted into the aligned pin aperture, wherein the wheeled pin comprises:
a pin body; and
a wheel housed within the pin body, the wheel configured to be deployed from a first position to a second position, wherein in the first position the wheel is housed within the pin body and in the second position at least a portion of the wheel extends from the pin body.

14. The mat system of claim 13, wherein the plurality of pin apertures of the first lip structure align with the plurality of pin apertures of the second lip structure to define a plurality of additional aligned pin apertures.

15. The mat system of claim 14, further comprising a plurality of locking pins inserted into the plurality of additional aligned pin apertures.

16. The mat system of claim 15, wherein at least one locking pin of the plurality of locking pins comprises an additional wheeled pin.

17. The mat system of claim 15, wherein each locking pin of the plurality of locking pins comprises a wheeled pin.

18. A method comprising:
positioning a first mat having a first pin aperture adjacent to a second mat having a second pin aperture;

aligning the first pin aperture of the first mat with the second pin aperture of the second mat; and inserting a pin having a wheel assembly into the first pin aperture and the second pin aperture.

19. The method of claim 18, further comprising moving the wheel assembly from a first position in which the wheel assembly is retracted into the pin to a second position in which the wheel assembly is extended from the pin.

20. The method of claim 19, further comprising moving the first mat and the second mat along a surface with the wheel assembly in contact with the surface.

\* \* \* \* \*